US008116195B2

(12) United States Patent
Hou et al.

(10) Patent No.: US 8,116,195 B2
(45) Date of Patent: Feb. 14, 2012

(54) TRANSMISSION AND RECEPTION OF REFERENCE PREAMBLE SIGNALS IN OFDMA OR OFDM COMMUNICATION SYSTEMS

(75) Inventors: Jason Hou, Carlsbad, CA (US); Jing Wang, San Diego, CA (US); Sean Cai, San Diego, CA (US); Dazi Feng, San Diego, CA (US); Yonggang Fang, San Diego, CA (US); Yunsong Yang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 1121 days.

(21) Appl. No.: 11/192,420

(22) Filed: Jul. 27, 2005

(65) Prior Publication Data

US 2006/0050799 A1 Mar. 9, 2006

Related U.S. Application Data

(60) Provisional application No. 60/591,894, filed on Jul. 27, 2004.

(51) Int. Cl.
*H04J 11/00* (2006.01)

(52) U.S. Cl. ......... 370/210; 370/208; 370/335; 375/364

(58) Field of Classification Search .................. 370/208, 370/210, 335, 342, 441, 349, 385; 375/130, 375/140, 146, 362–367; 708/400–405
See application file for complete search history.

(56) References Cited

U.S. PATENT DOCUMENTS

| | | | |
|---|---|---|---|
| 5,450,456 A | 9/1995 | Mueller | |
| 5,761,190 A | 6/1998 | Yamauchi et al. | |
| 6,226,337 B1 * | 5/2001 | Klank et al. | 375/367 |
| 6,438,183 B1 * | 8/2002 | Taura et al. | 375/343 |
| 6,459,744 B1 | 10/2002 | Helard et al. | |
| 7,263,058 B2 * | 8/2007 | Joo | 370/203 |
| 7,388,910 B2 * | 6/2008 | McKown | 375/232 |
| 7,418,046 B2 * | 8/2008 | Gore et al. | 375/260 |
| 2002/0086707 A1 * | 7/2002 | Struhsaker et al. | 455/561 |
| 2002/0159544 A1 * | 10/2002 | Karaoguz | 375/329 |
| 2003/0152023 A1 * | 8/2003 | Hosur et al. | 370/208 |
| 2004/0165650 A1 * | 8/2004 | Miyazaki et al. | 375/141 |
| 2004/0170157 A1 * | 9/2004 | Kim et al. | 370/349 |

(Continued)

FOREIGN PATENT DOCUMENTS

JP 8-228188 9/1996

(Continued)

OTHER PUBLICATIONS

"Air Interface for Fixed Broadband Wireless Access Systems," IEEE Standard for Local and Metropolitan Area Networks—Part 16, IEEE Std 802.16/2004, pp. 551-568.

(Continued)

*Primary Examiner* — Aung S Moe
*Assistant Examiner* — Awet Haile
(74) *Attorney, Agent, or Firm* — Perkins Coie LLP (57) ABSTRACT

Techniques for generating preamble sequences for OFDM and OFDMA communication systems based on CAZAC sequences with desired properties of constant amplitudes (CA) and zero autocorrelation (ZAC). Such preamble sequences may be used for synchronization and identification of individual transmitters. For example, the OFDMA symbol is constructed using a CAZAC sequence in the frequency-domain and the resulting time-domain waveform is a near-CAZAC sequence.

20 Claims, 7 Drawing Sheets

U.S. PATENT DOCUMENTS

| | | | |
|---|---|---|---|
| 2005/0002361 A1* | 1/2005 | Dick et al. | 370/335 |
| 2005/0036541 A1* | 2/2005 | McKown | 375/233 |
| 2006/0050624 A1* | 3/2006 | Akita | 370/208 |
| 2008/0107211 A1* | 5/2008 | Min et al. | 375/326 |

FOREIGN PATENT DOCUMENTS

| | | |
|---|---|---|
| JP | 9-502318 | 3/1997 |
| JP | 11-308194 | 11/1999 |
| JP | 2000-503494 | 3/2000 |
| JP | 2003-283455 | 10/2003 |
| JP | 2004-253899 | 9/2004 |
| WO | WO 97/26742 | 7/1997 |
| WO | WO 2006/015108 | 2/2006 |
| WO | WO 2006/129166 | 12/2006 |

OTHER PUBLICATIONS

"Part 16: Air Interface for Fixed and Mobile Broadband Wireless Access Systems Amendment for Physical and Medium Access Control Layers for Combined Fixed and Mobile Operation in Licensed Bands," Draft Amendment to IEEE Standard for Local and Metropolitan Area Networks, p802.16e/D3, May 31, 2004, 161 pages.

"Air Interface for Fixed Broadband Wireless Access Systems," Local and Metropolitan Area Networks —Part 16, IEEE P802.16-REVd/D5, May 2004, pp. 379-396.

"TP for Downlink Sychronization Channel Schemes for E-UTRA" 3GPP TSG-RAN1 WG1 #42bis, R1-051072, Oct. 10-14, 2005, 13 pages.

European Examiner Paul Scriven, Supplementary European Search Report dated Jun. 15, 2009 for European Patent Application No. EP 05781679.5 (6 pages).

State Intellectual Property Office of China, Office Action, dated Apr. 24, 2009 for Chinese Patent Application No. 200580027543.1 (5 pages).

English language translation of State Intellectual Property Office of China, Office Action, dated Apr. 24, 2009 for Chinese Patent Application No. 200580027543.1 (2 pages).

Japanese Intellectual Property Office, Office Action in Japanese Patent App. No. 2007-523803, mailed Dec. 1, 2009, 3 pages.

English language translation of Japanese Intellectual Property Office, Office Action in Japanese Patent App. No. 2007-523803, mailed Dec. 1, 2009, 3 pages.

* cited by examiner

TRANSMISSION AND RECEPTION OF REFERENCE PREAMBLE SIGNALS IN OFDMA OR OFDM COMMUNICATION SYSTEMS

CROSS REFERENCE TO RELATED APPLICATION

This application claims the benefit of provisional U.S. application Ser. No. 60/591,894, entitled "METHOD FOR THE TRANSMISSION AND RECEPTION OF REFERENCE PREAMBLE SIGNALS IN AN OFDMA SYSTEM" and filed Jul. 27, 2004, which is incorporated herein by reference in its entirety for all purposes.

BACKGROUND

This application relates to orthogonal frequency division multiplexing (OFDM) and orthogonal frequency division multiple access (OFDMA) communication systems, and more particularly to generation and transmission of preamble signals for fast cell searching, time-synchronization, and correcting initial frequency offset in an OFDM or OFDMA communication system.

OFDM and OFDMA systems may be used in various telecommunication systems, including wired and wireless communication systems, to provide various types of communication services, such as voice and data. A wireless communication system covers a certain geographic area by dividing the area into a plurality of cells, which can be further divided into two or more sectors. The base stations, which conceptually locate at the center of respective cells of their coverage, transmit information to the mobile subscriber stations (MSS) via downlink (DL) radio signals. A mobile station is also known as the mobile station (MS), the subscriber station (SS), or the wireless station. The mobile stations transmit information to their serving base stations via uplink (UL) radio signals.

The downlink radio signals from the base stations to mobile stations may include voice or data traffic signals or both. In addition, the base stations generally need to transmit preamble signals in their downlink radio signals to identify to the mobile stations the corresponding cells and corresponding segments in the cells to which the downlink radio signals are directed. Such a preamble signal from a base station allows a mobile station to synchronize its receiver in both time and frequency with the observed downlink signal and to acquire the identity, such as IDcell and Segment, of the base station that transmits the downlink signal.

IEEE 802.16 OFDMA has been developed to provide wireless communications based on an orthogonal frequency division multiple access (OFDMA) modulation technique. In the DL preambles currently defined in IEEE 802.16 OFDMA, the MSSs store predefined and handcrafted pseudo-noise (PN) like sequences for identifying IDcell numbers and segment numbers of the adjacent cells. In operation, a MSS captures the preamble symbols in received downlink signals and correlate the preamble in each received downlink signal with the stored pseudo-noise (PN) like sequences to determine IDcell and Segment of a specific sector for that received downlink signal. These preamble sequences are handcrafted in advance and are processed by the MSS one at a time. There are more than 100 such sequences in some implementations of the current IEEE 802.16 OFDMA. Performing the cross-correlation with such a large number of preamble sequences can be time consuming and increase the hardware costs. In addition, MSSs store the entire set of preamble sequences and this storage further increases the hardware cost.

One important performance parameter of the preambles is the peak-to-average-power-ratio (PAPR). To reduce the system cost, the PAPR for the preamble should be as small as possible. It is well known that OFDM usually has a relative higher PAPR ratio than other modulations. This is especially important for a preamble because the preamble is transmitted in every frame.

SUMMARY

This application provides, among others, techniques for generating preamble sequences for OFDM and OFDMA communication systems based on CAZAC sequences with desired properties of constant amplitudes (CA) and zero auto-correlation (ZAC).

In one implementation, a method for communications based on OFDM or OFDMA is described to include selecting an initial CAZAC sequence; modifying the initial CAZAC sequence to generate a modified sequence which has frequency guard bands; and using the modified sequence as part of a preamble of a downlink signal from a base station to a mobile station.

In another implementation, a method for communications based on OFDM or OFDMA is described to include selecting a CAZAC sequence of a length L in frequency which includes spectral components in first, second and third sequential portions in frequency, and modifying the CAZAC sequence to produce a first modified sequence. The modification includes setting amplitudes of spectral components in the first portion of the CAZAC sequence to zeros and adding a first phase shift on spectral components of the second portion of the CAZAC sequence, without changing the third portion. The CAZAC sequence is then modified to produce a second modified sequence by setting amplitudes of spectral components in the third portion of the CAZAC sequence to zeros and adding a second phase shift spectral components of the second portion of the CAZAC sequence, without changing the first portion. The first and second modified sequences are then combined to form a combined sequence in frequency of a length 2L. The first portion from the first modified sequence is positioned next to the third portion from the second modified sequence in the combined sequence. An inverse fast Fourier transform is then performed on the combined sequence to generate a first preamble sequence in time for OFDM and OFDMA communication.

In another implementation, a method for communications based on OFDM or OFDMA is disclosed to include sub sampling a preamble signal in a downlink signal received at a mobile station receiver to create a frequency overlap and to minimize a variation in amplitude, extracting an order of signal components in the preamble signal to identify at least a base station at which the downlink signal is generated. The preamble signal is generated from an initial CAZAC sequence to preserve properties of the initial CAZAC sequence and has frequency guard bands.

In some applications, the techniques described here may be used to provide the downlink (DL) preamble design to allow for a structural generation of preamble sequences to facilitate fast cell searching, simple time-synchronization and correction of initial frequency offset. The new DL preamble design is based on CAZAC sequences. The IDcell and Segment parameters are encoded as the code phase of the CAZAC sequence in the frequency domain or the code phase of the near-CAZAC sequence in the time domain.

These and other implementations and their variations, enhancements are described in greater detail in the attached drawings, the detailed description and the claims.

DETAILED DESCRIPTION

Designing a set of preambles with good correlation property and low PAPR is a difficult task because these two requirements tend to be conflicting. A family of mathematically well studied sequences known as CAZAC sequences has the desired properties of a constant amplitude (CA) (representing the lowest PAPR) and zero autocorrelation (ZAC). Well-known examples of CAZAC sequences include Chu and Frank-Zadoff sequences.

A Chu sequence is defined as $$c(n) = \exp(j\theta_{chu}(n)), n = 0, 1, \ldots, L-1 \tag{1}$$

where the phase in Chu sequences is $$\theta_{chu}(n) = \frac{\pi n^2}{L} \tag{2}$$

and L is the length of the sequence and can be any positive integer. The Frank-Zadoff sequences are also defined in (1) but the phase is defined as $$\theta_{frank}(n = p + q\sqrt{L}) = \frac{2\pi pq}{\sqrt{L}}, \tag{3}$$

where $p = 0, 1, \ldots, \sqrt{L}-1$ and $q = 0, 1, \ldots, \sqrt{L}-1$, and L is the length of the sequence and can be the square of any positive integer.

Let $c = [c_{L-1}, c_{L-2}, \ldots, c_0]^T$ be a CAZAC sequence and define the cyclic shift operator matrix M as $$M = [e_1 \, e_2 \ldots e_{L-1} \, e_0], \tag{4}$$

where $e_k$ is a standard basis vector of length L. For example, $e_k$ can be an all zero vector except the k-th element of unity. Define the circulant matrix C of the CAZAC sequence as $$
\begin{aligned}
C &= \text{Circ}\{c\} \\
&= [c \; Mc \; \cdots \; M^{L-1}c] \\
&= \begin{bmatrix} c_{L-1} & c_0 & c_1 & \cdots & c_{L-2} \\ c_{L-2} & c_{L-1} & c_0 & \cdots & c_{L-3} \\ c_{L-3} & c_{L-2} & c_{L-1} & \cdots & c_{L-4} \\ \vdots & \vdots & \vdots & \vdots & \vdots \\ c_0 & c_1 & c_2 & \cdots & c_{L-1} \end{bmatrix}
\end{aligned}
\tag{5}
$$

Define a L×L Fourier matrix as $$F_L = \frac{1}{\sqrt{L}} \begin{bmatrix} 1 & 1 & \cdots & 1 \\ 1 & \omega & \cdots & \omega^{L-1} \\ . & . & \cdots & . \\ 1 & \omega^{L-1} & \cdots & \omega^{(L-1)(L-1)} \end{bmatrix}_{L \times L} \tag{6}$$

where $\omega = \exp(-j2\pi/L)$. It can be shown that a circulant matrix can be uniquely expressed as $$C = F_L^H \Lambda_C F_L, \tag{7}$$

where $\Lambda_C = \text{diag}\{g_0, g_1, \ldots, g_{L-1}\}$ is the eigen matrix of the circulant matrix and $(\bullet)_H$ denote the Hermitian transpose.

A zero-autocorrelation sequence is characterized by its identity autocorrelation matrix, or $$\Phi_C = CC^H = I_{L \times L} = F_L^H \Lambda_C \Lambda_C^H F_L. \tag{8}$$

Equation (8) can be used to derive the following:

$$\Lambda_C \Lambda_C^H = \text{diag}\{|g_0|^2, |g_1|^2, \ldots, |g_{L-1}|^2\} = F_L F_L^H = I_{L \times L} \tag{9}$$

In other words, eigenvalues of a circulant matrix have equal amplitudes, or $|g_k| = \text{const}$, $k = 0, \ldots L-1$. Furthermore, these eigenvalues constitute the frequency spectral components of the ZAC sequence as is evident in the following equation, $$c = Ce_0 = F_L^H \Lambda_C F_L e_0 = \frac{1}{\sqrt{L}} F_L^H g, \tag{10}$$

where $e_0$ is the last column vector of M, defined in Equation (4), and $g = [g_0, g_1, \ldots, g_{L-1}]^T$ is the column vector formed by the eigenvalues of C.

Property 1: If c is a CAZAC sequence, then its frequency domain spectral components also form a CAZAC sequence (necessary condition).

Proof:

Let $\Lambda_M$ be the eigen matrix of the cyclic shift operator matrix M defined in Equation (4). It can be proved that $\Lambda_M = \text{diag}\{1, \omega, \omega^2, \ldots, \omega^{L-1}\}$, $\omega = e^{-j2\pi/L}$. Because M is a real matrix, the following expression can be obtained:

$$M = F_L^H \Lambda_M F_L = F_L \Lambda_M^H F_L^H. \tag{11}$$

For $k = 0, \ldots L-1$, the following can be written:

$$
\begin{aligned}
g^H(M^k g) &= Lc^H F_L^H M^k F_L c \\
&= Lc^H (\Lambda_M^k)^H c
\end{aligned}
\tag{12}
$$

-continued $$= L\sum_{n=0}^{L-1} \omega^{-kn}|c(n)|^2$$

$$= L\delta(k),$$

Therefore, the column vector g is a ZAC sequence. The eigenvalues of the circulant matrix C of a CAZAC sequence have equal amplitudes. With Equation (12) it is proven that the $g=[g_0, g_1, \ldots, g_{L-1}]^T$ sequence is a CAZAC sequence.

Property 2: If $g=[g_0, g_1, \ldots, g_{L-1}]^T$ is a CAZAC sequence in the frequency domain, then its corresponding time-domain sequence is also a CAZAC sequence (sufficient condition).

Proof:
Equations (10) and (11) can be used to derive the following:

$$c^H M^k c = \frac{1}{L} g^H F_L M^k F_L^H g \qquad (13)$$

$$= \frac{1}{L} g^H \Lambda_M^K g$$

$$= \frac{1}{L} \sum_{k=0}^{L-1} \omega^k$$

$$= \delta(k)$$

This shows that the time-domain sequence possesses ZAC property.

From Equation (10), g can be written as $$g = \sqrt{L} F_L c \qquad (14)$$

Because g is a CAZAC sequence, the following can be derived:

$$\delta(k) = g^H M^k g \qquad (15)$$

$$= L c^H F_L^H F_L (\Lambda_M^H)^k F_L^H F_L c$$

$$= L \sum_{n=0}^{L-1} |c_n|^2 \omega^{-kn}, k = 0, 1, \ldots, L-1.$$

Rewriting Equation (15) in matrix form yields the following:

$$\begin{bmatrix} 1 \\ 0 \\ \vdots \\ 0 \end{bmatrix} = L \begin{bmatrix} 1 & 1 & \cdots & 1 \\ 1 & \omega^{-1} & \cdots & \omega^{-(L-1)} \\ \vdots & \vdots & \cdots & \vdots \\ 1 & \omega^{-(L-1)} & \cdots & \omega^{-(L-1)(L-1)} \end{bmatrix} \begin{bmatrix} |c_0|^2 \\ |c_1|^2 \\ \vdots \\ |c_{L-1}|^2 \end{bmatrix} \qquad (16)$$

Solving Equation (16) leads to the following:

$$|c_k|^2 = \frac{1}{L}, k = 0, 1, \ldots, L-1. \qquad (17)$$

Therefore, the corresponding sequence in the time domain is also a CAZAC sequence.

From Property 1 and Property 2, the desired properties of the constant-amplitude and zero-autocorrelation of a CAZAC sequence are preserved in both time and frequency domain.

Therefore, a CAZAC sequence can be used for time and frequency synchronization and channel estimation by the mobile station receiver. However, due to guard bands and channel selective filtering in the IEEE 802.16 OFDMA system, a CAZAC sequence may not be directly used to construct a preamble, because such a CAZAC sequence does not have proper breaks and voids in frequency to meeting the transmit frequency spectrum mask for the guard bands and channel selective filtering.

In several exemplary implementations described below, a CAZAC sequence, such as the Chu or Frank-Zadoff sequence, can be modified in the frequency domain to generate a modified CAZAC sequence in the frequency domain that satisfies the IEEE 802.16 transmit frequency spectrum mask for the guard bands and channel selective filtering. The modified CAZAC sequence is no longer a mathematically perfect CAZAC sequence but is a near-CAZAC sequence whose amplitudes are nearly constant and the autocorrelation is nearly a delta function. This modified CAZAC sequence is transformed into the time domain under an inverse FFT to produce the desired preamble sequences for an OFDM or OFDMA based communication system. Similarly, a CAZAC sequence in the time domain may also be used to produce a modified CAZAC sequence in the frequency domain that satisfies the IEEE 802.16 transmit frequency spectrum mask for the guard bands and channel selective filtering.

Figure 1A:
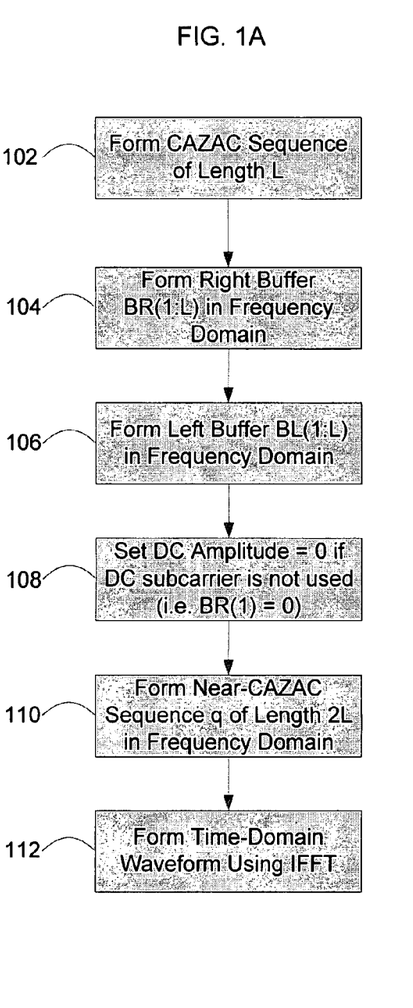
FIG. 1A illustrates the processing steps of one exemplary method of construction of a preamble sequence.
Figure 1B:
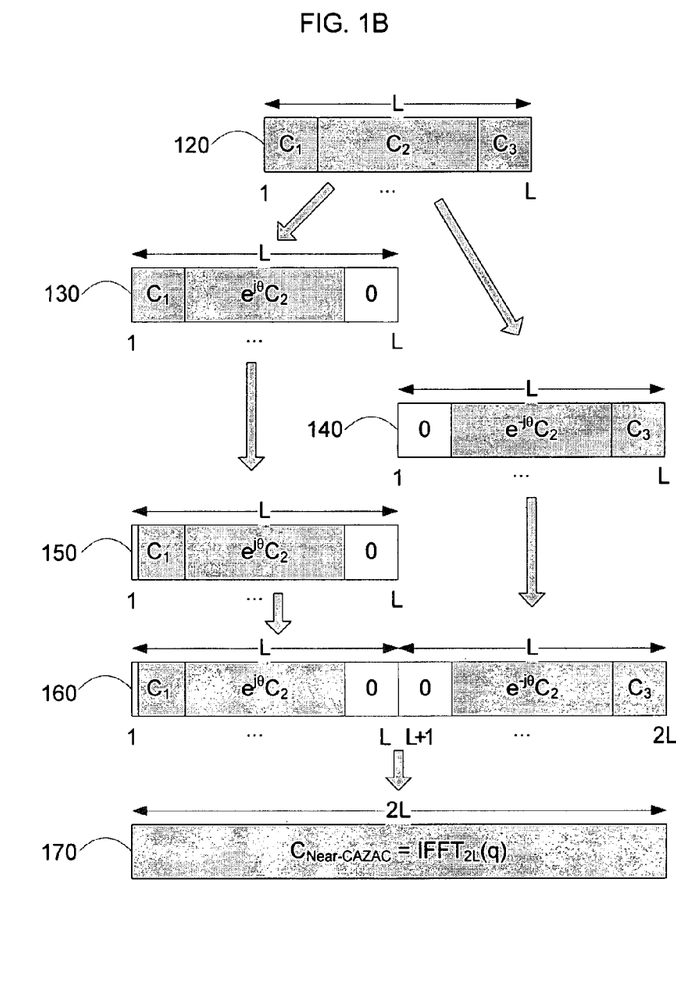
FIG. 1B illustrates the resulting sequence of each processing step of the exemplary method shown in FIG. 1A.

FIGS. 1A and 1B illustrate one exemplary method of construction of a preamble sequence 170 with a length of 2L in the time domain from a CAZAC sequence 120 with a length of L in the frequency domain. FIG. 1A shows the processing steps according to an exemplary operation flow and FIG. 1B shows the resulting sequence of each processing step in FIG. 1A.

Initially at step 102 in FIG. 1A, a CAZAC sequence of a length L is selected as the basis for construction of the preamble sequence. An example of such a CAZAC sequence 120 in the frequency domain is shown in FIG. 1B, where the sequence 120 is partitioned into a left or first portion C1, a center or second portion C2, and a right or third portion C3. The sizes of C1, C2 and C3 may vary depending on the specific requirements of the left guard band size, the right guard band size, and the length L. Next, the CAZAC sequence 120 in the frequency domain is transformed into a first modified CAZAC sequence 130 and a second modified CAZAC sequence 140, still in the frequency domain, as shown in FIG. 1B through the processing steps 104 and 106, respectively. The first and second modified CAZAC sequences 130 and 140 may be carried out in any order or simultaneously.

As illustrated, the first modified CAZAC sequence 130 is the right buffer and is formed by setting the amplitude of each component in C3 to zero and by adding a phase shift factor $e^{j\theta}$ for each component in C2. The frequency components in the left portion C1 are not changed. The second modified CAZAC sequence 140 is the left buffer and is formed by setting the amplitude of each component in C1 to zero and by adding a phase shift factor $e^{-j\theta}$ for each component in C2. This phase shift is opposite to the phase shift in the first modified CAZAC sequence 130. The right portion C3 is not changed. These processing steps set the amplitudes of the guard bands of the OFDMA spectral components to zeros. In FIG. 1A, the Left Buffer is at the left side of the DC component in the frequency spectrum under the Nyquist sampling rate and the Right Buffer is at the right side of the DC component. The DC component is the first frequency component in the first modified CAZAC sequence and is represented by the index "1" in FIG. 1B. Hence, the name designations do not reflect whether they appear on the left or right in FIG. 1B. In Step 108, the amplitude of the DC component is set to zero, if the DC subcarrier is not used, for example, as in the IEEE 802.16 OFDMA system.

Next in step 110, the first and second modified CAZAC sequences 150 and 140 are joined together in the frequency domain to construct a new sequence 160 of a length 2L, where the C3 of the first modified CAZAC sequence 150 is connected to the C1 of the second modified CAZAC sequence 140 in the frequency domain. In step 112, an inverse FFT is then performed on the new sequence 160 in the frequency domain to form the near-CAZAC sequence 170 as the preamble sequence in the time domain.

Figure 2A:
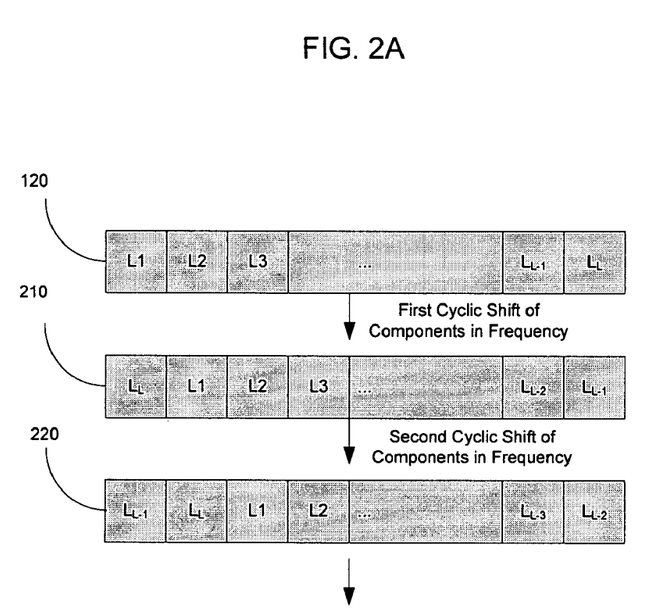
FIG. 2A shows an example of using the cyclic shift of initial CAZAC sequence in the frequency domain to generate two new initial CAZAC sequences in the frequency domain.

The above process forms one preamble sequence for identifying a particular cell sector or segment in a particular cell among many segments of adjacent cells within the radio ranges of the base stations in these adjacent cells. Different preamble sequences for different IDcells and different segments may be generated in different ways. As one exemplary implementation, a new preamble sequence may be generated by first performing a cyclic shift of components of the initial CAZAC sequence 120 in the frequency domain to produce a new initial CAZAC sequence. FIG. 2A illustrates this cyclic shift of the frequency components to generate two new CAZAC sequences 210 and 220 from the initial CAZAC sequence 120 of L components in the frequency domain. Then the two new initial CAZAC sequences 210 and 220 are processed according to step 104 to step 112 in FIG. 1A, respectively, to produce two corresponding near-CAZAC sequences in the time domain. Under this approach, a total of L different preamble sequences can be generated from the cyclic shift of the L components.

Figure 2B:
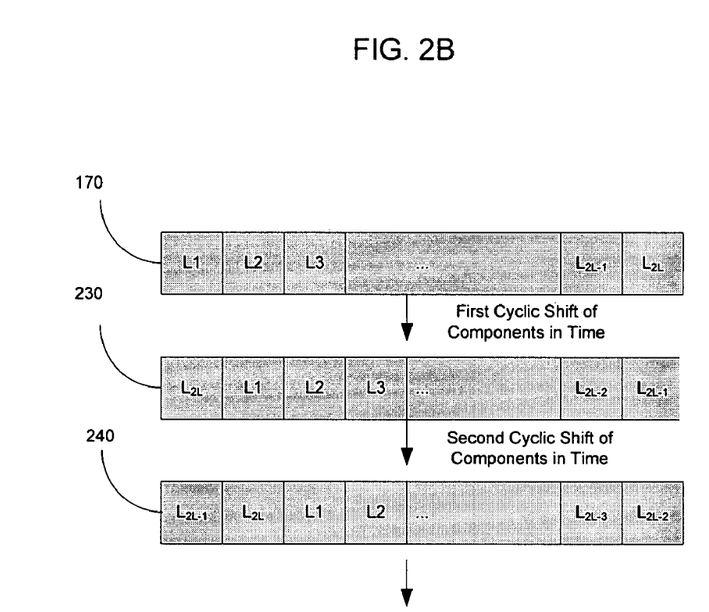
FIG. 2B shows an example of using the cyclic shift of the preamble sequence in the time domain to generate two new preamble sequences in the time domain.

FIG. 2B shows another way of generating different preamble sequences based on a cyclic shift of CAZAC sequence components in the time domain. The components of the near-CAZAC preamble sequence 170 generated from an initial CAZAC sequence 120 can be shifted in time to produce different near-CAZAC preamble sequences in time. As illustrated, the cyclic shift of preamble sequence 170 is used to generate two new preamble sequences 230 and 240. A total of 2L different preamble sequences can be generated from the cyclic shift of the 2L components. These sequences are sufficient to represent all IDcell and cell sectors/segments.

Figure 3:
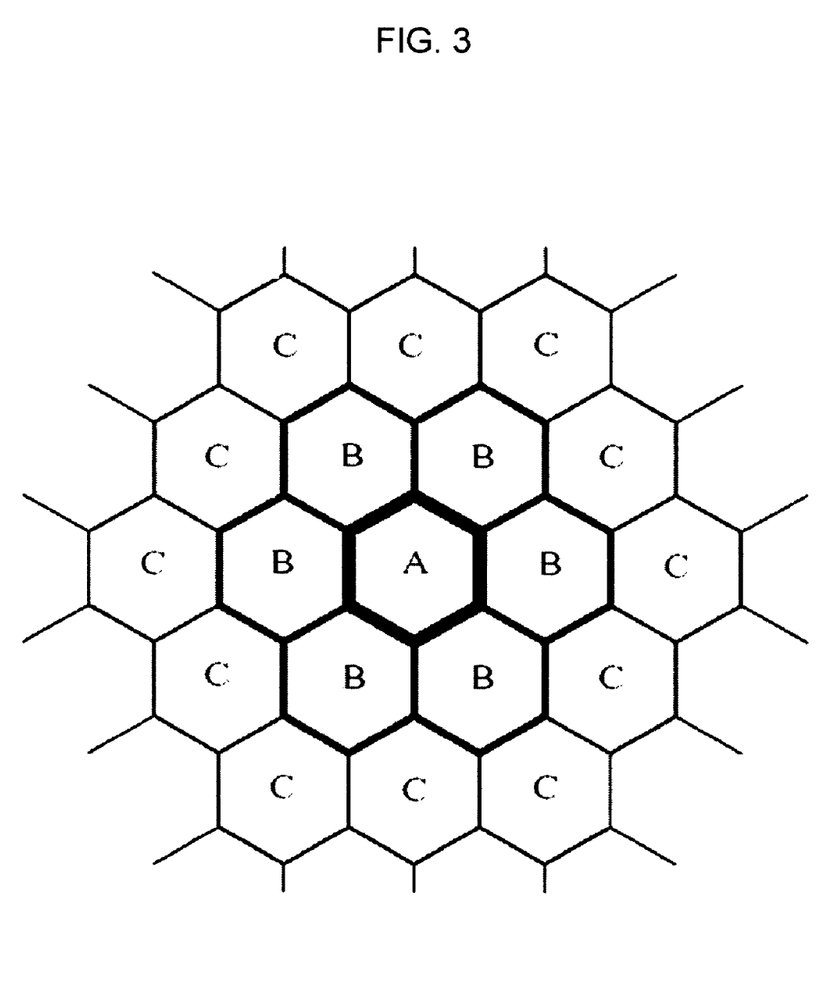
FIG. 3 shows an example of a 3-tier cell design used in various OFDM or OFDMA systems.

As an example, FIG. 3 shows a 3-tier cell design used in various OFDM or OFDMA systems where a base station can reach three layers of cells and each cell may have up to 6 cell segments and 6 adjacent cells. Hence, under this specific 3-tier cell design, the maximum number of cell segments in the total of 19 reachable cells from one base station is 19×6=114. Therefore, a CAZAC sequence of a length of at least 114 can have sufficient number of sequences for carry IDcell and segment numbers based on the above described implementation.

For illustration purpose, an exemplary OFDMA system with a 1024-FFT (Fast Fourier Transform) size, a left guard band of 87 FFT bins, commonly referred to as subcarriers, a right guard band of 86 subcarriers, and a configuration of four preamble carrier-sets is described here. For those skilled in the art, different values for the FFT size, the left and right guard band sizes, or the number of preamble carrier-sets may be used.

In the case of four-sector configuration in which each cell contains four sectors, one way to generate preambles is to divide the entire 1024 subcarriers into four equal subset, arranged in an interlaced manner. Effectively, there are four preamble carrier-sets. The subcarriers are modulated, for example, using a level boosted Phase Shift Keying (PSK) modulation with a CAZAC sequence cyclically shifted with a code phase defined by IDcell and Segment, which are the base station identity. More specifically, the four preamble carrier-sets are defined using the following formula:

$$\text{PreambleCarrierSet}_m = m + 4*k \tag{18}$$

where $\text{PreambleCarrierSet}_m$ specifies all subcarriers allocated to the specific preamble, m is the number of the preamble carrier-set indexed as 0, 1, 2, or 3, and k is a running index. Each segment of a cell is assigned one of the four possible preamble carrier-sets in this particular example.

To further illustrate, let the 1024-FFT OFDMA sampling rate be 20 MHz at the Nyquist rate. The basic preamble time-domain symbol rate is 10 MHz. The frequency-domain components are composed of a Chu sequence described in Equations (1) and (2) of length 128 that is zero-inserted to length 512 by inserting CAZAC symbols one for every four frequency bins. In the following, it can be established that a time-domain CAZAC sequence at the symbol rate (10 MHz) introduces a CAZAC sequence in frequency domain after spectrum folding. Its frequency-domain CAZAC sequence can be computed using a 512-FFT operation instead of a 1024-FET operation.

Let $h=[h_0, h_1, \ldots, h_{2L-1}]^T$ be a time-domain waveform of length 2L at the Nyquist rate. Its spectral components can be computed using Equation (14) as follows:

$$g_h = \sqrt{2L}\, F_{2L} h = \begin{bmatrix} g_{HL} \\ g_{HU} \end{bmatrix} \tag{19}$$

where $F_{2L}$ is the Fourier transform matrix of dimension 2L×2L and $g_{HL}$ and $g_{HU}$ are lower and upper portions of the frequency spectrum. When subsampling (i.e., down sampling) the waveform at the mobile station receiver at the symbol rate which is one half of the Nyquist rate, a spectrum folding in the frequency domain is introduced in the sampled signal at the mobile station. Let $h_E=[h_0, h_2, h_4, \ldots, h_{2L-2}]^T$ be the subsampled sequence of the even-numbered samples and $h_O=[h_1, h_3, h_5, \ldots, h_{2L-1}]^T$ the odd-numbered samples. Define to be the matrix operation that rearranges matrix columns into even and odd columns:

$$S = [e_0\, e_2 \ldots e_{2L-2} \vdots e_1\, e_3 \ldots e_{2L-1}]. \tag{20}$$

Therefore, $$\begin{bmatrix} h_E \\ h_O \end{bmatrix} = S^{-1} h = \frac{1}{\sqrt{2L}} S^{-1} F_{2L}^H \begin{bmatrix} g_{HL} \\ g_{HU} \end{bmatrix} \tag{21}$$

When simplified, the following can be derived:

$$h_E = \frac{1}{\sqrt{L}} F_L^H \left( \frac{g_{HL} + g_{HU}}{2} \right) = \frac{1}{\sqrt{L}} F_L^H g_{HE} \tag{22}$$

$$h_O = \frac{1}{\sqrt{L}} F_L^H \Lambda_\epsilon \left( \frac{g_{HL} - g_{HU}}{2} \right) = \frac{1}{\sqrt{L}} F_L^H g_{HO} \tag{23}$$

where $g_{HE}$ and $g_{HO}$ are spectral components of the even and odd sample sequences, and $\Lambda_\epsilon = \text{diag}\{1, \epsilon, \epsilon^2, \ldots \epsilon^{L-1}\}$, $\epsilon = \exp(j\pi/L)$.

Equations (22) and (23) can be used to derive the following spectrum folding relationships:

$$g_{HE}(k) = \frac{g_{HL}(k) + g_{HU}(k)}{2} \quad (24)$$

$$g_{HO}(k) = \varepsilon^k \left( \frac{g_{HL}(k) - g_{HU}(k)}{2} \right) \quad (25)$$

Equations (24) and (25) sum up the spectral folding phenomenon of the waveform subsampling of the downlink preamble signal at the mobile station. Hence, the subsampling is likely to introduce frequency folding, or spectrum aliasing. If the subsampling frequency is sufficiently low when sampling a received preamble sequence in time, the spectral components of the sampled signal overlap, resulting in the frequency folding. In some OFDM/OFDMA applications, this phenomenon is intentionally avoided in order to perfect the signal restoration.

The spectral folding via sub-sampling at the mobile station receiver, however, may be advantageously used as a technique to recover the CAZAC property of a unfortunately truncated CAZAC sequence due to spectral filtering described above. This is in part based on the recognition that, if the coherent channel bandwidth is much smaller than the sub-sampled signal bandwidth, there is little adverse effect to the preamble signals (not true for voice or data signals, however). As an example, a ½ sub-sampling can be used to intentionally create a "folded" or "aliased" spectrum that is exactly the CAZAC sequence. By virtue of the time-frequency duality property of a CAZAC sequence, the corresponding sequence in the time-domain is also a CAZAC sequence. Although the sub-sampled sequences maintain the desired CAZAC property, the non-sub-sampled (transmitted) sequences do not maintain the CAZAC property. For example, the PAPR is about 4.6 dB when the phase rotation shown in FIG. 1B is θ=π/3. To achieve lower PAPR, the phase θ can be adjusted to π/4. Although the "folded spectrum" is no longer an exact CAZAC sequence in the frequency domain, the resulting time domain waveform has a low PAPR of 3.0 dB.

This technique to preserve CAZAC sequence characteristics of the folded frequency spectrum in both frequency and time domains is now further described below.

Following on the above example, the above described construction of the CAZAC sequence in FIGS. 1A and 1B is used to reconstruct the 1024 subcarriers using the 4:1 zero-inserted 512-element frequency-domain CAZAC sequence of a 128-element Chu sequence such that, after the spectrum folding due to the down sampling at the mobile station receiver, the folded 512 spectral components form the frequency-domain CAZAC sequence of the Chu sequence.

Let $c_{chu}$ denote the time-domain 512-element CAZAC sequence and its frequency-domain CAZAC sequence be denoted as $g_{chu}$ (512 elements) and expressed as $$g_{chu}(4n+k) = \begin{cases} e^{j\frac{\pi n^2}{128}}, & n = 0, 1, \ldots, 127 \\ 0, & \text{otherwise} \end{cases} \quad (26)$$

where k denotes the fixed preamble carrier-set. $c_{chu}$ and $g_{chu}$ form a time-frequency pair and their relationship is expressed as $$c_{chu} = IFFT_{512}(g_{chu}). \quad (27)$$

In IEEE P802.16e/D3, the 1024-FFT OFDMA has 86 guard subcarriers on the left-hand side and 87 on the right-hand side. The DC (direct current) subcarrier resides on index 512. The construction procedures of assembling $g_L$ and $g_R$ of the left- and right-hand sides 1024-FFT OFDMA preambles are $$g_R(1:86) = g_{Chu}(1:86) \quad (28)$$

$$g_R(87:425) = e^{-j\pi/3} g_{Chu}(87:425) \quad (29)$$

$$g_R(426:512) = 0 \quad (30)$$

$$g_L(1:86) = 0 \quad (31)$$

$$g_L(87:425) = e^{j\pi/3} g_{Chu}(87:425) \quad (32)$$

$$g_L(426:512) = g_{Chu}(426:512) \quad (33)$$

In addition, if the DC component is not used, for example in IEEE 802.16 OFDMA system, then $$g_R(1) = 0 \quad (34)$$

The final reconstructed 1024-FFT frequency components of the preamble symbol is $$q(1:1024) = [g_R(1:512) : g_L(1:512)] \quad (35)$$

and its final reconstructed 1024 time-domain preamble sequence at Nyquist rate is $$c = IFFT_{1024}(q). \quad (36)$$

After spectrum folding due to subsampling at symbol rate in the time domain, the resulting folded frequency spectral components of even-numbered samples are, based on Equation (24), $$g(1:512) \sim g_L(1:512) + g_R(1:512) \quad (37)$$

The overlapped area has the following relationship $$g(87:425) \propto (e^{j\pi/3} + e^{-j\pi/3}) g_{Chu}(87:425) = g_{Chu}(87:425). \quad (38)$$

Equations (28)-(33) suggest that the CAZAC property is preserved. Note also that overlapped area of odd-numbered samples has the following relationship according to Equation (25):

$$g'(87:425) \sim (e^{j\pi/3} - e^{-j\pi/3}) g_{Chu}(87:425) = j\sqrt{3} g_{Chu}(87:425). \quad (39)$$

Therefore, the reconstructed time sequence has the lowest PAPR for the even-numbered sampled sequences and very low PAPR for the odd-numbered sampled sequences that only slightly deviate from the exact CAZAC sequences due to the guard bands requirement. The nominal PAPR of the time-domain sub-sampled sequences is less than 3 dB at all different code-phases. The frequency components of the reconstructed 1024-FFT in the preamble sequence have constant amplitudes and thus may be used to facilitate the channel estimation.

In one implementation, fast cell searching can be performed as follows: The IDCell and Segment allocation to different sector are done via assigning different CAZAC code phases of cyclic shift of the $g_{chu}$ sequence and forming the time-domain sequence in the same manners described in Equations (28)-(36).

Figure 4:
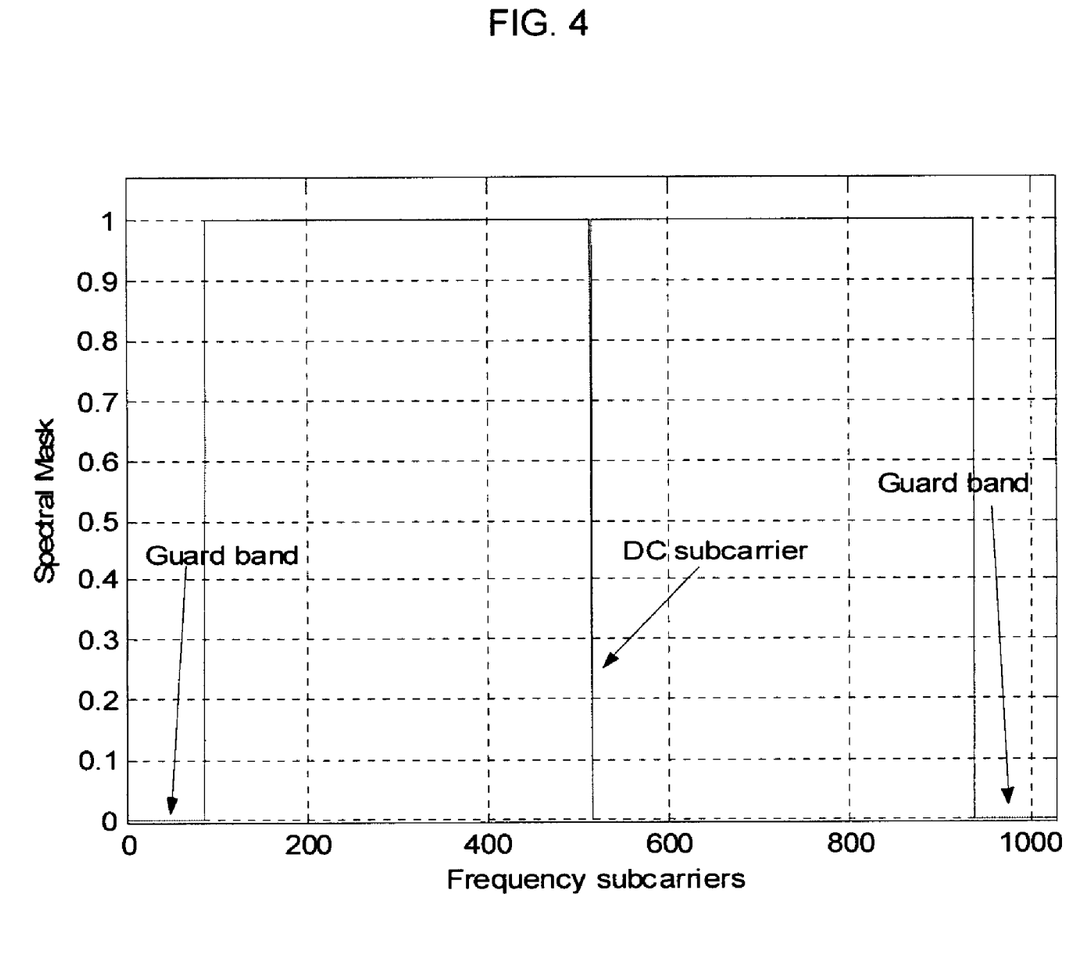
FIG. 4 shows an example of the subcarrier allocations in the frequency domain of the preamble sequence in segment 0.

FIG. 4 shows an example of the subcarrier allocations of the preamble sequence in segment 0.

Figure 5:
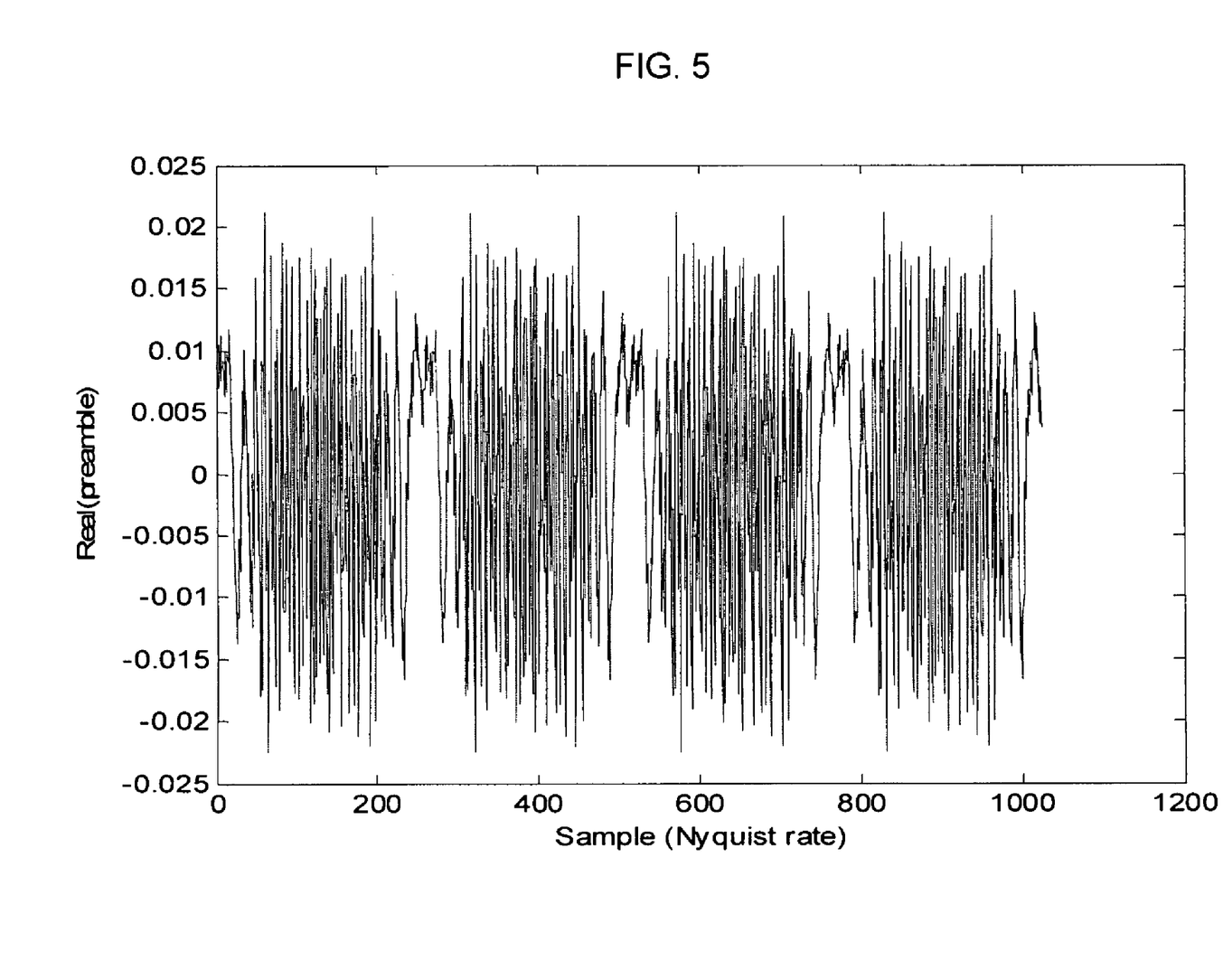
FIG. 5 shows the corresponding amplitude of the waveform in the time domain that corresponds to the example in FIG. 4.

FIG. 5 shows the corresponding amplitude of the waveform in the time domain. Because the frequency-domain spectral components form a CAZAC sequence, a new sequence formed by cyclically shifting the sequence of the spectral components, in the time domain (subsampled) also forms a CAZAC sequence. Due to the well-defined zero-autocorrelation properties, identifying code-phase and thereby identifying IDcell and segments can be made with optimal decision. The cyclic shifting of the order of different components in the PN sequence permits the MSS to retain one copy of the PN sequence without other shifted sequences. A simple look-up table may be used to provide the relationships between all sequences based on the cyclic shifting and the corresponding base stations and the associated cell sectors. Therefore, the present technique enables fast cell searching.

A CAZAC sequence has been used for channel sounding whereby the CIR (channel impulse response) can be uniquely determined because of the zero-autocorrelation property of the CAZAC sequence. In OFDMA or OFDM systems, we can use it not only to identify CIR but also to achieve fine timing synchronization whereby we can exclusively remove GI (guard interval) so as to minimize ISI.

Figure 6:
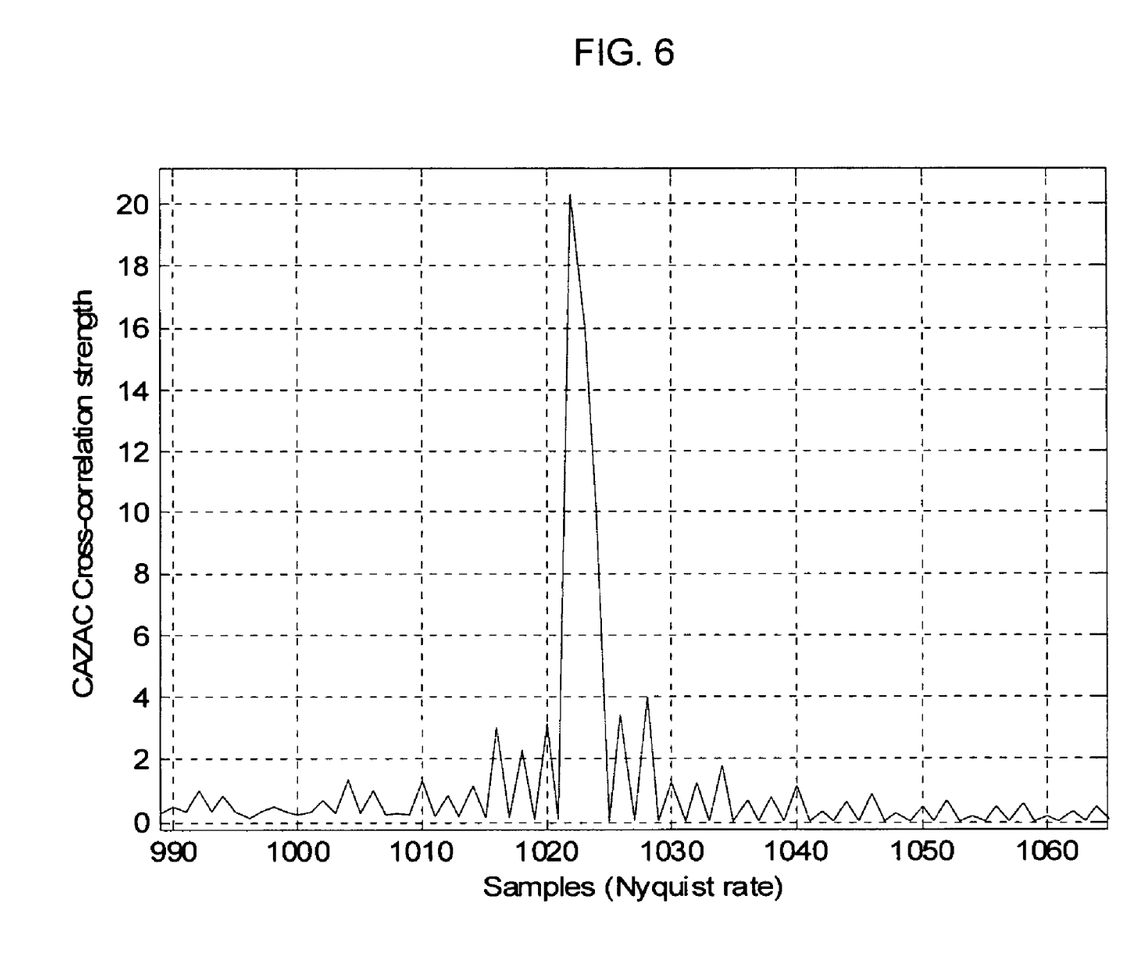
FIG. 6 shows the time waveform of the result of matched filtering of the CAZAC sequence (spaced by symbols) without channel distortion.
Figure 7:
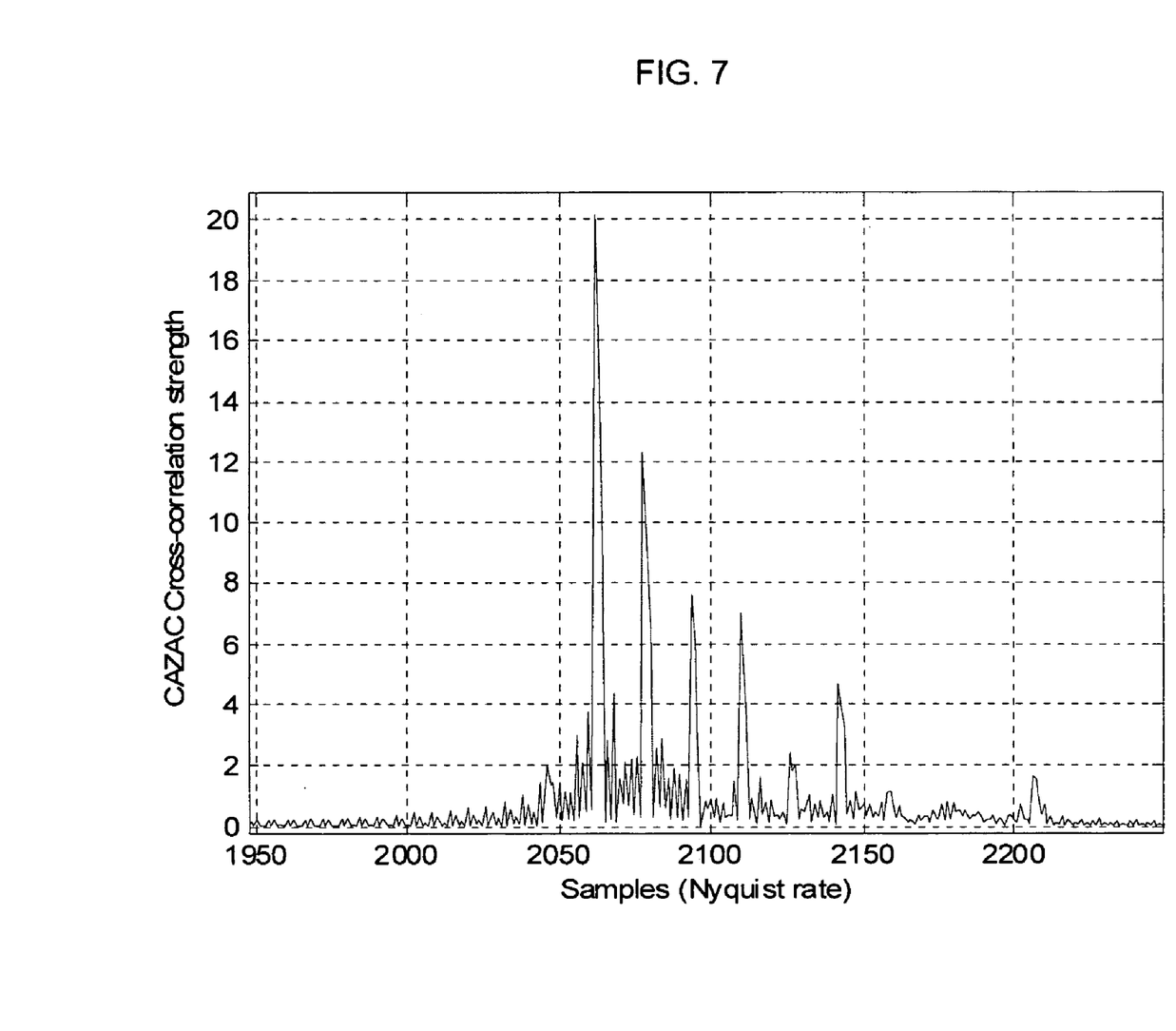
FIG. 7 shows the result of matched filtering of the CAZAC sequence in a multipath fading environment.

FIG. 6 shows the time waveform of the result of matched filtering of the near-CAZAC sequence (spaced by symbols) without channel distortion and FIG. 7 shows the result of matched filtering of the near-CAZAC sequence in a multipath fading environment. The waveforms are CIRs of the tested RF multipath environment.

For a sensible and low-cost TCXO, the clock precision is usually about 5 ppm for both the base station and the mobile station in some systems. At 10 GHz the frequency offset becomes 50 kHz. For a 11 kHz FFT spacing it spans 5 subcarriers in both directions.

The near-CAZAC sequence in the frequency domain can be used to simplify identification of peak positions of the cross-correlation. For example, for a sensible and low-cost TCXO, the clock precision is usually about 5 ppm (BS+SS). At 10 GHz carrier frequency the frequency offset becomes 50 kHz. For an 11 kHz FFT spacing it spans 5 subcarriers in both directions. We can assign code phase for different sectors that have different IDCells and segments by at least 10 code phase apart that accommodates ±5 subcarrier drifts due to large frequency offset, then we can easily perform frequency offset cancellation to within 11 kHz. Further fine correction utilizes pilot channel tracking.

The PAPR of the current preamble design is 4.6 dB. The PAPR can be further reduced by selecting different phase factor in Equations (29) and (32). For example, if we change the phase factor in Equations (29) and (32) from $e^{j\pi/3}$ to $e^{j\pi/4}$ as shown in Equations (40) and (41), then PAPR is reduced to 3.0 dB by compromising the CAZAC performance.

$$g_R(87:425)=e^{-j\pi/4}g_{Chu}(87:425) \qquad (40)$$

$$g_L(87:425)=e^{j\pi/4}g_{Chu}(87:425) \qquad (41)$$

Only a few implementations are described. Modifications, variations and enhancements may be made based on what is described and illustrated here.

What is claimed is:

1. A method for communications based on orthogonal frequency division multiplexing (OFDM) or orthogonal frequency division multiple access (OFDMA), comprising:
    selecting an initial constant amplitude zero autocorrelation (CAZAC) sequence;
    producing a first sequence by setting one or more amplitudes of respective one or more frequency components in a portion of the initial CAZAC sequence to zero and adding a first phase shift factor for one or more frequency components in another portion of the initial CAZAC sequence,
    producing a second, different sequence by setting one or more amplitudes of respective one or more frequency components in a different portion of the initial CAZAC sequence to zero and adding a second phase shift factor for one or more frequency components in the another portion of the initial CAZAC sequence, where the second phase shift factor is the inverse of the first phase shift factor,
    joining the first sequence and the second sequence, such that they are connected, to generate a modified sequence; and using the modified sequence as part of a preamble of a downlink signal from a base station to a mobile station.

2. The method as in claim 1, wherein the initial CAZAC sequence is a Chu sequence.

3. The method as in claim 1, wherein the initial CAZAC sequence is a Frank-Zadoff sequence.

4. The method as in claim 1, wherein the preamble comprises multiple components ordered in a preamble sequence, the method further comprising:
    using an order of the multiple components of the preamble sequence to identify the base station transmitter; and
    using different orders of the multiple components of the preamble sequence based on a cyclic shift of the orders of the multiple components to identify different base station transmitters.

5. The method as in claim 4, further comprising using different orders of the multiple components of the preamble sequence based on a cyclic shift of the orders of the multiple components to further identify different cells sectors in each cell of the base station.

6. The method as in claim 1, wherein the modifying of the initial CAZAC sequence comprises:
    selecting frequency components in the initial CAZAC sequence to create the frequency guard bands; and
    setting amplitudes of the selected frequency components in the initial CAZAC sequence to zero to create the frequency guard bands.

7. The method as in claim 6, wherein the modifying of the initial CAZAC sequence further comprises:
    adjusting a phase of a selected group of adjacent frequency components in the initial CAZAC sequence whose amplitudes are not changed.

8. The method as in claim 1, further comprising: subsampling the preamble at the mobile station to create a frequency overlap and to minimize a variation in amplitude.

9. The method as in claim 1, further comprising:
    performing an inverse transform operation to convert the modified sequence into a time domain representation for use in the preamble of the downlink signal, the time domain representation of the modified sequence comprising a near-CAZAC sequence.

10. A method for communications based on orthogonal frequency division multiplexing (OFDM) or orthogonal frequency division multiple access (OFDMA), comprising:
    selecting a constant amplitude zero autocorrelation (CAZAC) sequence of a length L in frequency which includes spectral components in first, second and third sequential portions in frequency;
    modifying the CAZAC sequence to produce a first modified sequence by setting amplitudes of spectral components in the first portion of the CAZAC sequence to zeros and adding a first phase shift on spectral components of the second portion of the CAZAC sequence, without changing the third portion;
    modifying the CAZAC sequence to produce a second modified sequence by setting amplitudes of spectral components in the third portion of the CAZAC sequence to zeros and adding a second phase shift on spectral components of the second portion of the CAZAC sequence, without changing the first portion;

combining the first and second modified sequences to form a combined sequence in frequency of a length 2L, wherein the first portion from the first modified sequence is positioned next to the third portion from the second modified sequence in the combined sequence;

performing an inverse fast Fourier transform on the combined sequence to generate a first preamble sequence; and using the first preamble sequence in a communication device for OFDM or OFDMA communication.

11. The method as in claim 10, further comprising setting widths of the first and third portions of the CAZAC sequence to achieve desired OFDMA guard bands.

12. The method as in claim 10, further comprising setting an amplitude of a DC subcarrier to zero when the DC subcarrier is not used.

13. The method as in claim 10, further comprising making the first phase shift and second phase shift to be opposite to each other.

14. The method as in claim 10, further comprising:
prior to generation of the first and the second modified sequences, performing a cyclic shift of frequency components of an initial CAZAC sequence to produce the CAZAC sequence which is subsequent used to generate the combined sequence; and using an order of the spectral components of the CAZAC sequence to identify at least an identity of a base station which transmits the first preamble sequence as part of a downlink signal.

15. The method as in claim 14, further comprising using the cyclic shift of frequency components of the initial CAZAC sequence to generate different orders of the frequency components in frequency to identify at least different base stations and different cell sectors of cells of the different base stations.

16. The method as in claim 10, further comprising:
performing a cyclic shift of time components of the first preamble sequence to generate a second preamble sequence.

17. The method as in claim 16, further comprising using the cyclic shift of time components of the initial CAZAC sequence to generate different orders of the time components to identify at least different base stations.

18. The method as in claim 17, further comprising using the cyclic shift of time components of the initial CAZAC sequence to generate different orders of the time components to represent, in addition to the different base stations, different cell sectors of cells of the different base stations.

19. The method as in claim 10, wherein the initial CAZAC sequence is a Chu sequence.

20. The method as in claim 10, wherein the initial CAZAC sequence is a Frank-Zadoff sequence.

* * * * *